(12) United States Patent
Mazziotti et al.

(10) Patent No.: US 6,286,651 B1
(45) Date of Patent: Sep. 11, 2001

(54) CLUTCH ADJUSTING RING

(75) Inventors: Philip J. Mazziotti, Toledo; Joe E. Gears, Jr., Perrysburg; Laurence Lee Glessmer, Toledo, all of OH (US)

(73) Assignee: PMX, Inc., Toledo, OH (US)

( * ) Notice: Subject to any disclaimer, the term of this patent is extended or adjusted under 35 U.S.C. 154(b) by 0 days.

(21) Appl. No.: 09/459,193

(22) Filed: Dec. 10, 1999

(51) Int. Cl.⁷ ...................................................... F16D 13/75
(52) U.S. Cl. .................................. 192/110 R; 192/111 B
(58) Field of Search ........................... 192/702.25, 70.26, 192/110 R, 111 R, 111 A, 111 B; 411/301, 302, 304

(56) References Cited

U.S. PATENT DOCUMENTS

| | | | |
|---|---|---|---|
| 2,462,603 | * 2/1949 | Boots | 411/304 |
| 4,760,906 | * 8/1988 | Flotow et al. | 192/70.25 |
| 5,213,185 | 5/1993 | Flotow . | |
| 5,263,564 | 11/1993 | Flotow . | |
| 5,456,345 | 10/1995 | Bissett . | |

* cited by examiner

Primary Examiner—Richard M. Lorence
(74) Attorney, Agent, or Firm—Marshall & Melhorn, LLC

(57) ABSTRACT

The externally threaded surface of a clutch adjusting ring is provided with circumferentially spaced friction-enhancing plugs, preferably formed of nylon. The plugs are friction fit into bores located between the first and last threads of the externally threaded surface. The nylon plugs are slightly longer than their bores and, therefore, the top surfaces of the plugs extend slightly beyond the externally threaded surface. As the externally threaded surface of the ring is threaded into the cover, the corresponding internally threaded surface of the cover cuts through the radially extending plugs located in the threads of the ring. The plugs frictionally grip the cover thereby preventing, or greatly reducing, the amount of play in the adjusting ring, yet allowing the ring to be readily turned manually. In alternate embodiments, the friction-enhancing plugs are provided just on the corresponding threaded surface of the clutch cover, or on both the internally threaded surface of the clutch cover and the externally threaded surface of the clutch adjusting ring.

11 Claims, 2 Drawing Sheets

CLUTCH ADJUSTING RING

BACKGROUND OF THE INVENTION

The invention relates to clutches and, more particularly, to improved adjusting rings used in clutches.

In order to transmit drive from an engine-driven flywheel to an output shaft, many clutches utilize levers for selectively urging driving and driven disks into contact with one another. The levers have first ends pivoted on a release sleeve and second ends pivoted on a clutch cover which rotates with the flywheel. Intermediate the ends of each lever are abutment surfaces which urge a pressure plate against the discs to effect frictional coupling of the discs. As the discs wear, the clutch will begin to slip if the position of the levers is not adjusted to compensate for the wear.

The adjustment is commonly accomplished by an adjusting ring having an externally threaded surface which is threadably coupled to an internally threaded surface of the clutch cover. By rotating the adjusting ring so as to axially advance it with respect to the clutch cover and the drive train, the second ends of the levers may be advanced so as to maintain proper pressure between the abutting surfaces of the levers and the pressure plate.

When the clutch is disengaged, the clutch adjusting ring is subject to substantial vibrations from the engine, especially in heavy truck applications. These heavy vibrations cause significant wear on the adjusting ring, and may even cause the ring to jump its threads. This, in turn, results in a loss of clutch adjustment and typically requires replacement of the adjusting ring.

Devices and methods to compensate for thread wear are well known. In one method, a seal is placed by, or around, the circumference of the threads to retain them in their proper position. These seals, however, frequently create an excessive amount of friction in the clutch, often causing the clutch to seize. Alternatively, means for locking the adjusting ring to the clutch cover may be used. However, this results in the loss of clutch adjustment once the driving and driven disks begin to wear. Additional methods include splitting the adjusting ring, sizing it to compensate for the thread wear, and then welding it back together. The splitting method, however, often produces an out-of-round ring which causes vibration or even driveline damage and clutch failure under load.

Therefore, it would be advantageous to have an inexpensive and efficient method to secure the adjusting ring to the clutch cover to withstand the vibrations of the engine, reduce or eliminate threadwear, and preserve the ability of the ring to provide clutch adjustment.

SUMMARY OF THE INVENTION

The invention is a clutch adjusting ring designed to reduce, or eliminate, threadwear by providing a more secure engagement between the externally threaded surface of the ring and the internally threaded surface of the clutch cover. Although the ring and clutch cover threaded surfaces are securely engaged, the invention allows the clutch to be readily adjusted to compensate for wear on the drive and driven disks.

In a preferred embodiment, the invention comprises a clutch adjusting ring having a plurality of plugs seated within bores formed within the externally threaded surface of the ring. Preferably, three cylindrical plugs are fit into bores spaced equally about the circumference of the ring. The plugs are located between the first and last threads of the threaded surface of the ring.

The plugs may preferably be formed of temperature resistant nylon, and have a slightly greater outer diameter than the diameter of the bores to ensure a tight frictional fit. The end of the plugs preferably extend slightly radially outward beyond the outer diameter of the threads of the ring.

With the plugs located within the adjusting ring, the ring is threaded into cover. As the threads of the adjusting ring advance into the cover, the corresponding threads in the cover cut through the radially extending plugs located in the threads of the ring. The plugs frictionally grip the threads of the cover, thereby preventing, or greatly reducing, the amount of "play" in the adjusting ring, yet allowing the ring to be readily turned manually.

In one alternate embodiment, the plurality of plugs are located similarly within bores formed in the internally threaded surface of the clutch cover. In yet another alternate embodiment, one or more plugs may be located within both the internally threaded surface of the clutch cover and the externally threaded surface of the clutch adjusting ring. While ease of manufacture may suggest use of the first embodiment of the invention, these embodiments will also effectively prevent, or greatly reduce, the amount of "play" between the clutch cover and the adjusting ring.

The resulting clutch adjusting ring is capable of withstanding the vibrations of the engine, reducing or eliminating threadwear, and preserving the ability of the ring to provide clutch adjustment.

BRIEF DESCRIPTION OF THE DRAWINGS

The above, as well as other advantages of the present invention, will become readily apparent to those skilled in the art from the following detailed description of the preferred embodiments when considered in the light of the accompanying drawings, in which.

DETAILED DESCRIPTION OF THE PREFERRED EMBODIMENT

It is to be understood that the specific structures and processes illustrated in the attached drawings, and described in the following description are simply exemplary embodiments of the inventive concepts defined in the appended claims. Hence, specific dimensions and other physical characteristics relating to the embodiments disclosed herein should not be considered as limiting, unless the claims expressly state otherwise.

Figure 1:
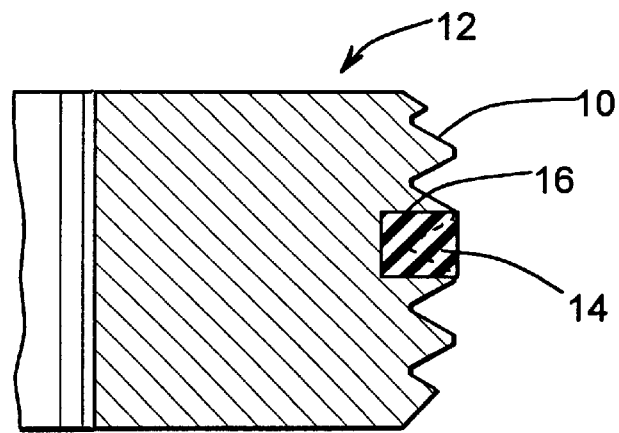
FIG. 1 is a broken cross-sectional view depicting a bore and a plug within the externally threaded surface of an adjusting ring in accordance with the invention.

Referring now to the drawings, FIG. 1 depicts a portion of a radial externally threaded surface 10 of a clutch adjusting ring 12. Located within the externally threaded surface 10 of the clutch adjusting ring 12, is a plurality of temperature resistant plugs 14, preferably cylindrical in shape. The plugs 14 are friction fit into a plurality of circumferentially spaced, radially extending bores 16 of complementary shape formed within the externally threaded surface 10 of the clutch adjusting ring 12. The diameter and depth of the bores 16 will depend on the application. The diameter of the bores 16 may be on the order of approximately ¼ of an inch; slightly smaller than the diameter of the plugs 14 to assure a tight frictional fit. The depth of the bores 16 may be approximately ¼ of an inch deep.

Figure 2:
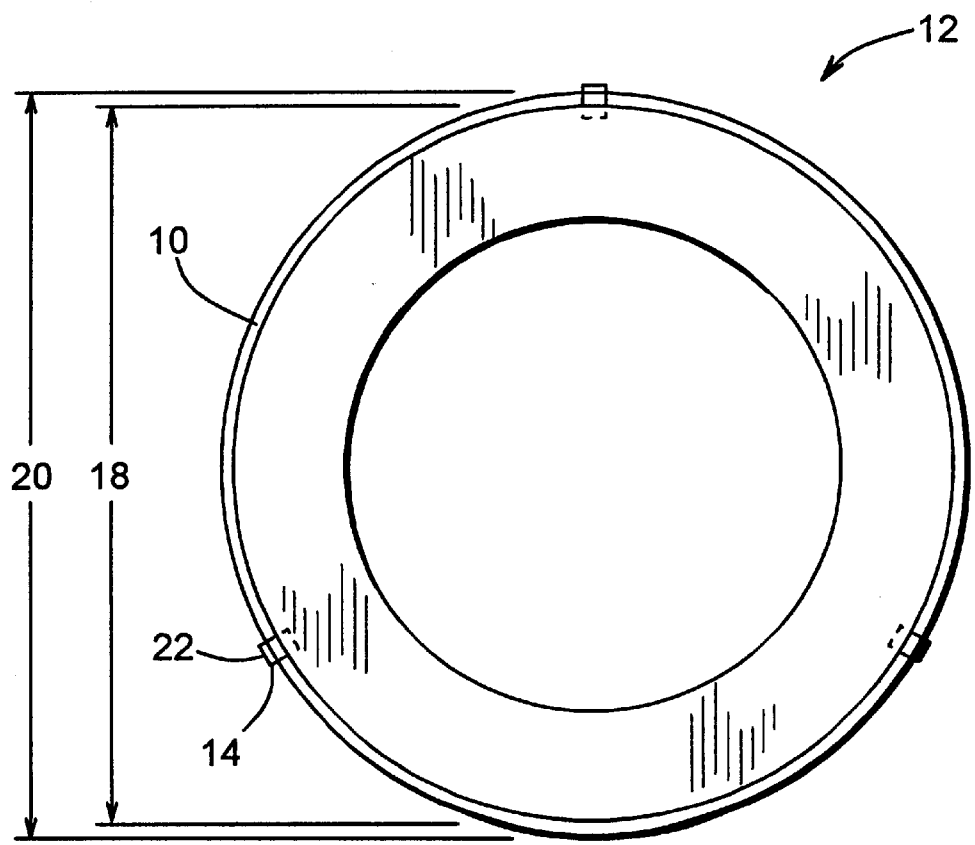
FIG. 2 is a top, somewhat schematic, view depicting a plurality of radially extending, circumferentially spaced plugs within the threaded surface of an adjusting ring.

The plugs 14 are preferably located after the first thread of the externally threaded surface 10 of the clutch adjusting ring 12. The plugs 14 are not located before or on the first thread, otherwise the threaded surface 10 of the adjusting ring 12 may be difficult to start in the clutch cover. In a preferred embodiment, the plugs 14 are located approximately equidistant from the first and last threads of the externally threaded surface 10 of the adjusting ring 12. Furthermore, as depicted in FIG. 2, it is preferred that the plugs 14 are placed approximately equidistant around the perimeter of the clutch adjusting ring 12. In a most preferred embodiment, a total of three plugs 14 are located around the perimeter, approximately equally spaced, and located at about the mid-point between the first thread and the last thread of the externally threaded surface 10 of the adjusting ring 12.

The externally threaded surface 10 is defined by a series of threads with alternating inner 18 and outer 20 diameters. In a preferred embodiment, the top surfaces 22 of the plugs 14 extend at least slightly radially outward beyond the inner diameter 18 and, most preferably, beyond the outer diameter 20 of the externally threaded surface 10 of the adjusting ring 12. In a most preferred embodiment, the top surface 22 of the plugs 14 extend radially outward beyond the outer diameter 20 of the adjusting ring 12 by about 1/32 of an inch.

Preferably, the plugs 14 are constructed of a temperature resistant polymer, most preferably a nylon, capable of withstanding the elevated temperatures encountered in an operational clutch. Nylon plugs are preferable not only for their temperature resistance, but also for their ability to provide compressive effect to the threads of the adjusting ring 12 and clutch cover once threadably engaged.

Figure 3:
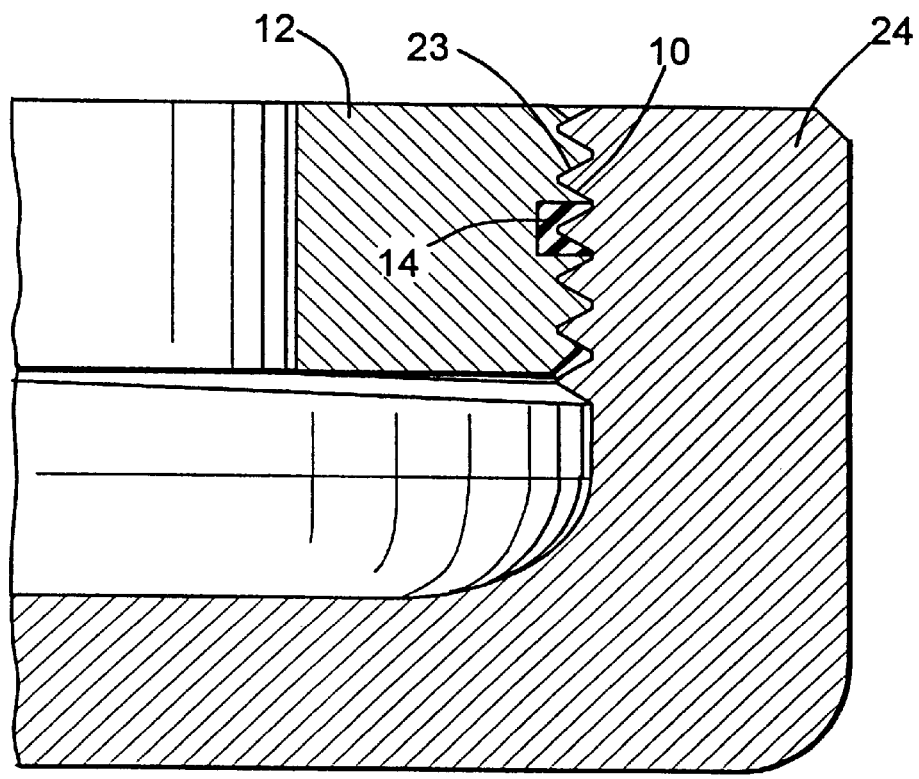
FIG. 3 is a broken cross-sectional view depicting a plug within the externally threaded surface of a clutch cover engaged with a complementary internally threaded surface of a clutch cover; and, FIG. 4 is a broken cross-sectional view depicting a bore and a plug within the internally threaded surface of the clutch cover.

FIG. 3 depicts a portion of the radial, externally threaded surface 10 of a clutch adjusting ring 12 engaged with a complementary radial internally threaded surface 23 of a clutch cover 24. As the externally threaded surface 10 of the adjusting ring 12 advances into the cover 24, the internally threaded surface 23 of the cover 24 cuts through the radially extending plugs 14 located in the externally threaded surface 10 of the ring 12. The plugs 14 create additional friction between the externally threaded surface 10 of the clutch adjusting ring 12 and the internally threaded surface 23 of the cover 24, thereby preventing, or greatly reducing, the amount of "play" in the adjusting ring 12, yet allowing the ring 12 to be readily turned manually.

Figure 4:
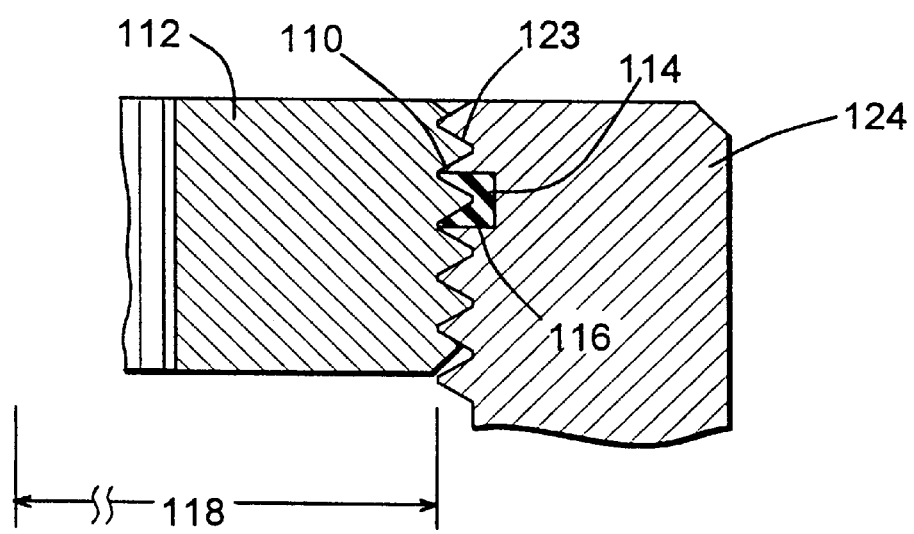

FIG. 4 depicts another embodiment of the invention, wherein 100 has been added to the reference numerals for identical elements from FIGS. 1, 2 and 3. In this embodiment, the internally threaded surface 123 of the clutch cover 124 is provided with a plurality of bores 116 and plugs 114 in a manner similar to that for the adjusting ring of the described embodiment. Although this embodiment provides very similar advantages to locating the plugs 114 in the adjusting ring 112, due to space constraints within the clutch cover 124 it may be more difficult to manufacture.

A plurality of cylindrical plugs 114 are located within the internally threaded surface 123 of the clutch cover 124, preferably located approximately equidistant from the first and last threads of the internally threaded surface 123 of the cover 124. Locating the plugs 114 after the first thread facilitates the initial engagement of the threaded surfaces 110 and 123. Additionally, the plugs 114 are preferably placed approximately equidistant around the perimeter of the cover 112. In a most preferred embodiment, a total of three plugs 114 are located around the perimeter, approximately equally spaced, and located at about the midpoint between the first and the last threads of the internally threaded surface 123 of the clutch cover 124.

The depth and size of the bores 116 in the cover 124 may be identical to those in the adjusting ring 112. Furthermore, the same type of temperature resistant nylon plug 114 may most preferably be used to frictionally fit into the clutch cover bores 116. The top surface of plug 122 would similarly extend beyond the inner diameter 118 of the clutch cover 124.

The adjusting ring 112 is then threaded into the cover 124 containing the plugs 114. As the threads of the adjusting ring 110 advance into the cover 124, they cut into the plugs 114 located in the internally threaded surface 123 of the cover 124. The plugs 114 create additional friction between the respective threaded surfaces, 110 and 123, thereby preventing, or greatly reducing, the amount of "play" in the adjusting ring 112, yet allowing the ring 112 to be readily turned manually.

In yet another alternate embodiment, depicted by combining FIG. 1 and FIG. 4, one or more plugs, 14 and 114, are located within bores, 16 and 116, formed within both the internally threaded surface 123 of the clutch cover 124 and the externally threaded surface 10 of the clutch adjusting ring 12. This embodiment will also effectively prevent, or greatly reduce, the amount of play between the clutch cover and the adjusting ring.

In accordance with the provisions of the patent statutes, the present invention has been described in what is considered to represent its preferred embodiment, however, it should be noted that the invention can be practiced otherwise than as specifically illustrated and described without departing from its scope or spirit.

What is claimed is:

1. A clutch adjusting ring, comprising:
   a threaded surface adapted to engage a complementary threaded surface on a clutch cover;
   a plurality of circumferentially spaced radially extending bores formed in said adjusting ring threaded surface; and,
   a plug located within each of said bores, said plugs being adapted to frictionally engage said complementary threaded surface on a clutch cover so as to reduce relative axial movement between said clutch adjusting ring and said clutch cover while allowing relative rotation therebetween.

2. The adjusting ring of claim 1, wherein said bores and said plugs have a cylindrical shape.

3. The adjusting ring of claim 1, wherein said plugs are formed of a temperature resistant polymer material.

4. The adjusting ring of claim 1, wherein said plugs being of a slightly larger diameter than said bores to ensure a tight friction fit therebetween.

5. The adjusting ring of claim 1, wherein said plugs extend slightly radially outward beyond the outer diameter of said clutch adjusting ring threaded surface.

6. A clutch cover with a clutch adjusting ring, comprising:
   a clutch cover having a threaded surface;
   a clutch adjusting ring having a threaded surface in engagement with the threaded surface of said clutch cover;

a plurality of circumferentially spaced radially extending bores formed in either said threaded clutch adjusting ring surface or said threaded clutch cover surface, or both, and, a plug located within each of said bores, said plugs being adapted to frictionally engage said complementary threaded surface on a clutch cover so as to reduce relative axial movement between said clutch adjusting ring and said clutch cover while allowing relative rotation therebetween.

7. The clutch cover and clutch adjusting ring of claim 6, wherein said bores and said plugs have a cylindrical shape.

8. The clutch cover and clutch adjusting ring of claim 6, wherein said plugs are formed of a temperature resistant polymer material.

9. The clutch cover and clutch adjusting ring of claim 6, wherein said plugs being of a slightly larger diameter than said bores to ensure a tight friction fit therebetween.

10. The clutch cover and clutch adjusting ring of claim 6, wherein said plugs extend radially beyond said bores.

11. The adjusting ring of claim 1, wherein said bores are placed approximately equidistant around the perimeter of said clutch adjusting ring.

* * * * *